United States Patent [19]

Sonnenberg et al.

[11] Patent Number: 5,240,967
[45] Date of Patent: Aug. 31, 1993

[54] METHOD FOR IMPROVING THE EXPANDABILITY OF STYRENIC POLYMER PARTICLES

[75] Inventors: Fred M. Sonnenberg, Merion; Dennis M. Hajnik, West Chester; William J. Poole, Crum Lynne, all of Pa.

[73] Assignee: ARCO Chemical Technology, L.P., Wilmington, Del.

[21] Appl. No.: 18,601

[22] Filed: Feb. 17, 1993

[51] Int. Cl.$^5$ .............................................. C08J 9/16
[52] U.S. Cl. .................................... 521/57; 521/56; 521/59; 521/60; 521/147
[58] Field of Search ................. 521/59, 56, 60, 57, 521/147

[56] References Cited

U.S. PATENT DOCUMENTS

| | | | |
|---|---|---|---|
| 2,816,827 | 12/1957 | Roth | 521/56 |
| 2,864,778 | 12/1958 | Mladnich | 521/56 |
| 2,910,446 | 10/1959 | Roth | 521/56 |
| 3,386,926 | 6/1968 | Gavoret | 521/56 |
| 3,462,380 | 8/1969 | Ronden | 521/56 |
| 3,468,820 | 9/1969 | Buchholtz et al. | 521/56 |
| 3,994,841 | 11/1976 | Ikeda et al. | 521/60 |
| 4,036,794 | 7/1977 | Keppler et al. | 521/60 |
| 5,128,073 | 7/1992 | Allen et al. | 521/57 |

*Primary Examiner*—Morton Foelak
*Attorney, Agent, or Firm*—Jonathan L. Schuchardt

[57] ABSTRACT

A method for improving the expandability of styrenic polymer particles is disclosed. The method comprises copolymerizing a styrenic monomer with an amount of an acrylate monomer effective to improve the expandability of the particles without adversely affecting their heat sensitivity. Polymer foams of low density can be prepared with reduced amounts of blowing agents.

12 Claims, No Drawings

METHOD FOR IMPROVING THE EXPANDABILITY OF STYRENIC POLYMER PARTICLES

FIELD OF THE INVENTION

The invention relates to the preparation of styrenic polymer particles useful for making foams. In particular, the invention is a process for improving the expandability of styrenic polymer particles by incorporating an effective amount of an acrylate monomer into the expandable polymer particles.

BACKGROUND OF THE INVENTION

Styrenic polymer foams are produced commercially by extrusion and foaming of molten polymers, or by expansion and molding of polymer particles. Blowing agents such as pentane are routinely used to expand the polymers to produce foams. Increasingly tough legislation limits allowable emissions of volatile organic compounds (VOC), so foam manufacturers need ways to foam polymer particles with reduced levels of blowing agents.

Polystyrene particles having improved expandability can be prepared by polymerizing styrene in aqueous suspension in the presence of chain-transfer agents or styrene oligomers. The method of Hahn et al. (U.S. Pat. Nos. 4,525,484, 4,520,135, and 4,513,105) illustrates this approach. A chain-transfer agent, such as n-dodecyl mercaptan, is introduced during styrene polymerization. The polymer product has a reduced proportion of very high molecular weight polystyrene, and has improved expandability compared with products made in the absence of the chain-transfer agent.

Additional routes to styrenic polymer particles with improved expandability are needed. A desirable approach would eliminate the need for introducing a chain-transfer agent at a particular stage of the polymerization. Ideally, the method would give high-quality styrenic polymer particles having improved expandability at little or no added cost. In addition, the heat sensitivity of the polymer particles, i.e., the tendency of the particles to shrink during pre-expansion, would be minimized.

SUMMARY OF THE INVENTION

The invention is a method for improving the expandability of styrenic polymer particles. The method comprises copolymerizing, in an aqueous suspension, a styrenic monomer and an acrylate monomer, wherein the acrylate monomer is used in an amount effective to improve the expandability of the particles without adversely affecting their heat sensitivity. The acrylate monomer is preferably used in an amount within the range of about 0.1 to about 10 weight percent based on the amount of styrenic monomer.

The invention also includes a method for making styrenic polymer particles having improved expandability that uses a "seeded particle" approach. This method comprises copolymerizing, in an aqueous suspension, a styrenic monomer and an acrylate monomer in the presence of styrenic polymer seed particles to form coated particles that have a styrenic polymer core and a styrenic/acrylate copolymer outer coating, wherein the acrylate monomer is used in an amount effective to improve expandability of the coated particles without adversely affecting their heat sensitivity.

DETAILED DESCRIPTION OF THE INVENTION

The styrenic polymer particles of the invention are conveniently prepared by aqueous suspension polymerization of one or more styrenic monomers. Suitable styrenic monomers include, but are not limited to, styrene, α-substituted styrenes such as α-methylstyrene and α-ethylstyrene, alkylated styrenes such as 2-methylstyrene, 3-butylstyrene, 4-ethylstyrene, and the like, halogenated styrenes such as 4-chlorostyrene, 2-bromostyrene, and the like, and mixtures thereof. Thus, the styrenic polymer can include one or more different styrenic monomers. Styrene is the most preferred styrenic monomer.

An acrylate monomer is copolymerized with the styrenic monomer(s) to improve the expandability of the styrenic polymer particles according to the method of the invention. Preferred acrylate monomers have the general structure $CH_2=CR-CO_2R'$, in which each of R and R' separately represents hydrogen or a linear, branched, or cyclic $C_1-C_{30}$ alkyl, aryl, aralkyl, or alkoxyalkyl group. Most preferred acrylate monomers are linear and branched $C_1-C_{10}$ alkyl esters of acrylic and methacrylic acid.

Suitable acrylate monomers include, but are not limited to, methyl acrylate, ethyl acrylate, n-butyl acrylate, n-hexyl acrylate, 2-ethylhexyl acrylate, cyclohexyl acrylate, 2-ethoxyethyl acrylate, 2-methoxyethyl acrylate, n-octyl acrylate, lauryl acrylate, 2-phenoxyethyl acrylate, benzyl acrylate, decyl acrylate, methyl methacrylate, ethyl methacrylate, n-butyl methacrylate, 2-ethylhexyl methacrylate, allyl methacrylate, cyclohexyl methacrylate, stearyl methacrylate, lauryl methacrylate, and the like, and mixtures thereof.

The relative amount of acrylate monomer included in the polymerization is important. We surprisingly found that incorporation of low levels of acrylates significantly improves expandability. The minimum amount used should be that which is sufficient to improve the expandability of the styrenic polymer particles. Expandability is a measure of the amount of blowing agent needed to produce a foam of a particular density from expandable styrenic polymer particles. Polymer particles having better expandability are those that require relatively less blowing agent to produce a foam of a particular density.

If the proportion of acrylate monomer used is too large, however, undesirable shrinkage may occur during pre-expansion of the particles, particularly when higher levels of blowing agent are used. Thus, the preferred amount of acrylate monomer is an amount sufficient to improve expandability, but not so much that particle shrinkage occurs during pre-expansion. The main purpose of including the acrylate is to allow manufacture of foams of low density using a minimum amount of blowing agent. This goal is achieved when a sufficient amount of acrylate is used, but can be frustrated by the sensitivity of the polymers to heat, and resulting particle shrinkage if too much acrylate is included.

The amount of acrylate monomer needed for optimum particle expandability depends on many factors (as will be apparent to those skilled in the art), such as the particular acrylate and styrenic monomers used, the polymerization method, and other considerations; the preferred amount is best determined empirically. Generally, however, the amount of acrylate monomer used will be within the range of about 0.1 to about 10 weight percent based on the amount of styrenic monomer used. A more preferred range is from about 0.3 to about 5 wt. %. Most preferred is the range from about 0.5 to about 3 wt. %.

Small amounts of difunctional acrylate monomers and/or difunctional vinyl monomers are optionally included in the polymerizations as crosslinking agents. Examples of suitable difunctional monomers include, but are not limited to, divinylbenzene, divinyltoluene, diallyl methacrylate, 1,4-butanediol diacrylate, ethylene glycol dimethacrylate, diethylene glycol dimethacrylate, and the like, and mixtures thereof. Generally, the amount of difunctional monomer will be less than about 0.04 wt. % based on the weight of styrenic polymer particles. A more preferred amount is less than about 0.02 wt. %.

The styrenic polymer particles can be prepared by any method known in the art, including bulk, solution, emulsion, and suspension polymerization. Aqueous suspension polymerization is preferred because this process readily gives styrenic polymer particles.

In one embodiment of the invention, an aqueous suspension polymerization process is used. The styrenic monomer and acrylate monomer can be simply combined with suspending agents, free-radical catalysts, surfactants, blowing agents, etc., and be polymerized in a single step; such a process is well known (see, e.g., U.S. Pat. No. 4,029,614). A two-step process, in which the polymer particles are prepared in the absence of a blowing agent, and are later resuspended in water and impregnated with the blowing agent can also be used. In either process, the acrylate monomer can be introduced at the start of the polymerization, or the acrylate monomer addition can be delayed until the polymerization is already in progress.

In another embodiment of the invention, styrenic polymer particles having improved expandability are prepared by a "seeded particle" method. The seeded particle method is generally described, for example, in U.S. Pat. Nos. 4,173,688, 4,333,969, and 4,385,156, the teachings of which are incorporated herein by reference in their entirety. Briefly, the method involves polymerizing a styrenic monomer in an aqueous suspension in the presence of styrenic polymer particles. In the present invention, a mixture of an acrylate monomer and a styrenic monomer is copolymerized in the presence of styrenic polymer seed particles. The resulting product is a coated particle that has a styrenic polymer core and a styrenic/acrylate copolymer outer coating. The amount of acrylate monomer used is the amount effective to improve the expandability of the coated particles without adversely affecting their heat sensitivity. The preferred amount of acrylate monomer to be used has been previously described in this application.

An advantage of the invention is that low-density foamed articles of high quality can be produced with reduced amounts of blowing agent. By reducing the amount of hydrocarbon emissions while still producing low-density foam, foam molders can more easily comply with legislation that limits allowable VOC emissions.

The method of the invention is also cost effective—only a small amount of a relatively inexpensive monomer is needed, so the improved product can be made at little to no additional cost. Added savings also result from the reduced requirement for blowing agent.

The following examples merely illustrate the invention. Those skilled in the art will recognize man variations that are within the spirit of the invention and scope of the claims.

COMPARATIVE EXAMPLE 1

Preparation of Expandable Polystyrene Particles
(One-Step Process—No Acrylate Present)
Pre-expansion of the Particles A one-half gallon stirred glass reactor is charged with water (566 g) and hydroxyethyl cellulose (0.70 g). The mixture is stirred for 0.5 h at 30° C. Tricalcium phosphate (2.07 g) is added, followed by dibutyltin maleate (0.57 g), ethylenediaminetetraacetic acid (0.021 g), polyethylene wax (0.10 g), and a solution of benzoyl peroxide (1.87 g) and tert-butyl perbenzoate (0.73 g) in styrene (550 g). The mixture is heated to 90° C. over 1.5 h, and is held at 90° C. for another 5.5 h. After 215 min. at 90° C., a solution of polyvinyl alcohol (0.57 g) in water (100 g) is added. The reactor is pressurized to 50 psi with nitrogen, and n-pentane (45 g) is added over 90 min. The reactor is heated to 115° C. over 90 min., and is held at 115° C. for 6.5 h. Upon cooling, the particles are centrifuged and washed with water.

The apparatus for steam pre-expansion of the particles consists of a 5-gallon metal bucket that has a 100-mesh screen welded into place about 3 inches from the bottom of the bucket. Below the screen is an inlet for steam. The density potential of pre-expanded polystyrene particles is determined as follows. The steam bucket is pre-heated with 15 psig steam for about one minute, and is then allowed to cool to room temperature. Polystyrene particles (about 30 g) are poured into the bucket. Steam is passed into the bucket through the inlet for 3 min, causing the particles to expand. The steam is turned off, and the pre-expanded particles are removed and allowed to dry overnight. Density is measured on the day following expansion.

EXAMPLES 2-6

Preparation of Expandable Styrene/Acrylate
Copolymer Particles Pre-expansion of the Particles
Simple Copolymerization—One-Step Process The method of Comparative Example 1 is followed, except that an acrylate monomer is included in the polymerization. Table 1 indicates the particular acrylate monomer included in each example, and the amount used. Except for Examples 2A, 3A, 5A, and 6A, the acrylate monomer is added initially with the styrene.

The batches of styrene/acrylate copolymer particles are impregnated with varying amounts of pentane, and are steam expanded as described in Comparative Example 1 to give pre-expanded particles (pre-puff). The densities of the pre-expanded particles are listed in Table 1.

As shown in Table 1, ordinary polystyrene particles require about 5.9 wt. % pentane to give pre-expanded particles having a density of about 1.0 pcf (see Comparative Example 1). By including a relatively small proportion of an acrylate monomer in the polymerization, the amount of pentane required to give preexpanded particles of density 1.0 pcf or less is significantly reduced. For example, when 3.0 wt. % of n-hexyl acrylate is copolymerized with styrene (Example 4A), only 4.55 wt. % of pentane is needed to give pre-expanded particles having a density of about 1.0 pcf. Examples 2, 3, 5, and 6 illustrate the same general effect when small amounts of n-butyl acrylate, 2-ethylhexyl methacrylate, 2-ethylhexyl acrylate, or n-butyl methacrylate are copolymerized with styrene.

Delayed Addition Method: Examples 2A, 3A, 5A, and 6A

The general procedure of Comparative Example 1 is modified slightly. The acrylate monomer addition is delayed until the "settling point" of the polymerization, which occurs about 220 minutes into the polymerization. As shown in Table 1, the copolymer particles prepared by this method also have improved expandability compared to polymer particles prepared in the absence of an acrylate monomer.

COMPARATIVE EXAMPLE 7

Preparation of Expandable Polystyrene Particles Pre-expansion of the Particles Simple Polymerization—Two-Step Process A one-half gallon stirred glass reactor is charged with water (500 g), styrene (500 g), benzoyl peroxide (1.62 g), tert-butyl perbenzoate (0.28 g), polyethylene wax (1.02 g), sodium bisulfite (0.0070 g), and tricalcium phosphate (5.0 g). The mixture is stirred and heated to 90° C. A solution of "Nacconol" suspending agent (0.035 g of 1% solution, product of Stepan Chemical) in water (10 mL) is added. The mixture is kept at 90° C. for 5.5 h, and is then heated to 135° C. for 2 h. The solution is cooled to 70° C. and tricalcium phosphate (1.0 g) is added, followed by "Triton X-165" surfactant (0.91 g, product of Union Carbide) and "Brij 58" surfactant (0.73 g, product of ICI Americas). Pentane is added over 2.5 h while the mixture is heated from 70° C. to 105° C. The polymerization is completed by heating for 2 h at 115° C. The polymer particles are isolated and pre-expanded as previously described.

EXAMPLES 8-10

Preparation of Expandable Styrene/Acrylate Copolymer Particles Pre-expansion of the Particles Simple Copolymerization—Two-Step Process The procedure of Comparative Example 7 is followed, except that an acrylate monomer (n-butyl acrylate or 2-ethylhexyl methacrylate) is copolymerized with styrene. The results are shown in Table 2. These examples demonstrate that the two-step process—in which polymer particles are first isolated, then resuspended in water and impregnated with a blowing agent13 can be used to make acrylate copolymers according to the method of the invention.

COMPARATIVE EXAMPLE 11

Preparation of Expandable Polystyrene Particles (No Acrylate Present); Pre-expansion of the Particles Seeded Particle Method—Two-Step Process A two-liter resin kettle equipped with an agitator, reflux condenser, combination baffle/thermometer wells, and monomer feed port, is charged with a slurry of polystyrene beads (484 g; through 25 mesh, on 45 mesh particle size (U.S. Standard Sieve)), water (440 g), and tricalcium phosphate (15.5 g). The slurry is heated with stirring at 400 rpm to 70° C.

Styrene (132 g), benzoyl peroxide (0.64 g), and tert-butyl perbenzoate (0.10 g) are combined, and this mixture is added to the resin kettle continuously over 20 min. at 70° C. The suspension is heated to 90° C., and is kept at 90° C. for 1.5 h. The mixture is then heated at 135° C. for 2 h. The resulting polymer particles are isolated and washed with water.

The polymer particles are impregnated with pentane as follows. Glass bottles are charged with distilled water (100 mL), polystyrene beads (100 g, prepared as described above), pentane (4 to 7 wt. %, variable), tricalcium phosphate (2.0 g), "Nacconol" suspending agent (0.50 mL of 1.0% solution), "Triton X-165" surfactant (0.15 g), and "Brij 58" surfactant (0.13 g). The bottles are shaken, sealed, placed in a tumbler, and heated at 90° C. for 2 h, then at 120° C. for 2 h. The bottles are cooled to room temperature, and the impregnated particles are collected by filtration, washed with 1N HCl, and tray dried. The impregnated particles are pre-expanded as previously described.

EXAMPLES 12-15

Preparation of Expandable Styrene/2-Ethylhexyl Methacrylate Copolymer Particles; Pre-expansion of the Particles Seeded Particle Method—Two-Step Process The method of Comparative Example 11 is followed, except that the styrenic polymer particles are suspended in aqueous media with a polymerizable mixture of styrene (1.3 moles) and 2-ethylhexyl methacrylate (EHM). The amount of 2-ethylhexyl methacrylate used in each example is shown in Table 3. The batches of styrene/2-ethylhexyl methacrylate copolymer particles are impregnated with varying amounts of pentane, and are steam expanded as previously described to give pre-expanded particles. The densities of the particles and an indication of whether or not particle shrinkage occurs are listed in Table 3.

As shown in Table 3, a significant reduction in particle density per amount of pentane used occurs at an EHM level of 0.074 moles (2.50 wt. %). Without the acrylate monomer present, about 4.9 wt. % pentane is needed to give pre-expanded particles having a density of about 1.0 pcf. Significantly less pentane is needed to give particles of 1.0 pcf or lower density when about 2.50 wt. % of the acrylate monomer is included. Note that at high enough levels of acrylate monomer (about 0.10 mole, 3.39 wt. %), densities begin to increase as the particles become more sensitive to heat-induced shrinkage during pre-expansion. Thus, the window of opportunity for improvement in expandability is somewhat narrower for polymer particles made by the seeded particle method because the control particles with no acrylate monomer present have relatively good expandability compared with particles made by simple polymerization.

EXAMPLES 16-19

Preparation of Expandable Styrene/n-Butyl Acrylate Copolymer Particles; Pre-expansion of the Particles Seeded Particle Method—Two-Step Process The method of Examples 12-15 is followed, except that n-butyl acrylate is substituted for 2-ethylhexyl methacrylate. The amount of n-butyl acrylate used in each example is shown in Table 4. The batches of styrene/n-butyl acrylate copolymer particles are impregnated with varying amounts of pentane, and are steam expanded as previously described to give pre-expanded polymer particles. The densities of the particles and an indication of whether or not particle shrinkage occurs are listed in Table 4.

As shown in Table 4, a significant reduction in particle density per amount of pentane used occurs at n-butyl acrylate levels as low as about 0.100 moles (2.33 wt. %). Without the acrylate monomer present, about 4.9 wt. % pentane is needed to give pre-expanded particles having a density of about 1.0 pcf. Significantly less pentane is needed to give particles of 1.0 pcf or lower density when about 2.3–2.5 wt. % of the acrylate monomer is included. Note that at high enough levels of acrylate monomer (about 0.2 moles, 5.0 wt. %), densities begin to increase as the particles become more sensitive to heat-induced shrinkage during pre-expansion.

The preceding examples are meant only as illustrations; the boundaries of the invention are defined by the following claims.

TABLE 1

Effect of Acrylate Addition on Expandability of Polystyrene - Simple Copolymerization

| Ex # | Acrylate[1] | Moles[2] | Wt. % | Delayed add?[3] | Pentane (wt. %)[4] | Density (pcf)[5] |
|---|---|---|---|---|---|---|
| C1 | Control | — | — | — | 6.25 | 0.91 |
|  |  |  |  |  | 5.58 | 1.11 |
| 2A | BA | 0.050 | 1.17 | Yes | 5.18 | 0.98 |
| 2B |  |  |  | No | 4.53 | 1.10 |
| 2C |  | 0.13 | 3.00 | No | 4.68 | 1.10 |
| 3A | EHM | 0.050 | 1.70 | Yes | 4.98 | 0.82 |
| 3B |  |  |  | No | 5.25 | 0.89 |
| 3C |  | 0.089 | 3.00 | No | 5.30 | 0.83 |
|  |  |  |  |  | 4.68 | 0.92 |
| 4A | HA | 0.11 | 3.00 | No | 4.55 | 1.04 |
|  |  |  |  |  | 5.27 | 0.84 |
| 5A | EHA | 0.042 | 1.42 | Yes | 4.69 | 0.82 |
| 5B |  |  |  | No | 5.73 | 0.81 |
|  |  |  |  |  | 4.28 | 1.14 |
| 6A | BMA | 0.044 | 1.13 | Yes | 5.16 | 1.00 |
| 6B |  |  |  | No | 5.25 | 0.92 |

[1] BA = n-butyl acrylate, EHM = 2-ethylhexyl methacrylate, HA = n-hexyl acrylate, EHA = 2-ethylhexyl acrylate, BMA = n-butyl methacrylate.
[2] Moles = number of moles of acrylate added; 5.5 moles of styrene polymerized.
[3] Acrylate is added either initially (No), or is delayed until about 220 minutes into the polymerization, i.e., at the settling point of the particles (Yes).
[4] Wt. % of pentane based on the weight of impregnated polymer particles.
[5] Density in pounds per cubic foot; pre-expansion time = 3 minutes.

TABLE 2

Effect of Acrylate Addition on Expandability of Polystyrene - Two-Step Process

| Ex # | Acrylate[1] | Moles[2] | Wt. % | Shrinkage? | % Pentane[3] | Density, pcf[4] |
|---|---|---|---|---|---|---|
| C7 | Control | — | — | No | 5.19 | 1.04 |
|  |  |  |  |  | 4.88 | 1.30 |
|  |  |  |  |  | 4.36 | 1.54 |
| 8 | BA | 0.050 | 1.17 | No | 4.99 | 0.95 |
| 9 | BA | 0.100 | 2.34 | No | 4.77 | 1.33 |
| 10 | EHM | 0.050 | 1.69 | No | 4.00 | 1.62 |

[1] BA = n-butyl acrylate; EHM = 2-ethylhexyl methacrylate
[2] Moles = number of moles of acrylate added; 5.0 moles of styrene polymerized.
[3] Wt. % of pentane based on the weight of impregnated polymer particles.
[4] Density in pounds per cubic foot; pre-expansion time = 3 minutes.

TABLE 3

Effect of 2-Ethylhexyl Methacrylate Addition on Expandability of Polystyrene - Seeded Particle Method

| Ex # | Acrylate[1] | Moles[2] | Wt. % | Shrinkage? | % Pentane[3] | Density, pcf[4] |
|---|---|---|---|---|---|---|
| C11 | Control | — | — | No | 5.25 | 0.91 |
|  |  |  |  |  | 4.89 | 1.04 |
|  |  |  |  |  | 4.47 | 1.32 |
| 12 | EHM | 0.050 | 1.69 | No | 5.22 | 0.89 |
|  |  |  |  |  | 5.00 | 0.99 |
|  |  |  |  |  | 4.55 | 1.14 |
| 13 |  | 0.074 | 2.50 | No | 5.39 | 0.78 |
|  |  |  |  |  | 5.04 | 0.79 |
|  |  |  |  |  | 4.70 | 0.86 |
| 14 |  | 0.100 | 3.39 | Yes | 5.29 | 1.25 |
|  |  |  |  |  | 4.76 | 0.97 |
|  |  |  |  |  | 4.39 | 1.02 |
| 15 |  | 0.147 | 5.00 | Yes | 5.39 | 1.11 |
|  |  |  |  |  | 5.01 | 1.03 |
|  |  |  |  |  | 4.65 | 1.11 |

[1] EHM = 2-ethylhexyl methacrylate
[2] Moles = number of moles of EHM added.
[3] Wt. % of pentane based on the weight of impregnated polymer particles.
[4] Density in pounds per cubic foot; pre-expansion time = 3 minutes.

TABLE 4

Effect of n-Butyl Acrylate Addition on Expandability of Polystyrene - Seeded Particle Method

| Ex # | Acrylate[1] | Moles[2] | Wt. % | Shrinkage? | % Pentane[3] | Density, pcf[4] |
|---|---|---|---|---|---|---|
| C11 | Control | — | — | No | 5.25 | 0.91 |
|  |  |  |  |  | 4.89 | 1.04 |
|  |  |  |  |  | 4.47 | 1.32 |
| 16 | BA | 0.050 | 1.16 | No | 5.44 | 0.86 |
|  |  |  |  |  | 5.03 | 0.96 |
|  |  |  |  |  | 4.68 | 1.07 |
| 17 |  | 0.100 | 2.33 | No | 5.33 | 0.79 |
|  |  |  |  |  | 4.85 | 0.82 |
|  |  |  |  |  | 4.44 | 0.96 |
| 18 |  | 0.107 | 2.50 | No | 5.09 | 0.83 |
|  |  |  |  |  | 4.68 | 0.92 |
|  |  |  |  |  | 4.11 | 1.05 |
| 19 |  | 0.214 | 5.00 | Yes | 5.23 | 1.04 |
|  |  |  |  |  | 4.75 | 0.96 |
|  |  |  |  |  | 4.40 | 0.96 |

[1] BA = n-butyl acrylate
[2] Moles = number of moles of BA added.
[3] Wt. % of pentane based on the weight of impregnated polymer particles.
[4] Density in pounds per cubic foot; pre-expansion time = 3 minutes.

We claim:

1. A method for improving the expandability of styrenic polymer particles, said method comprising copolymerizing in an aqueous suspension a styrenic monomer and an acrylate monomer, wherein the acrylate monomer is used in an amount within the range of about 0.3 to about 5 weight percent based on the amount of styrenic monomer and said amount to improve the expandability of the particles without adversely affecting their heat sensitivity.

2. The method of claim 1 wherein the acrylate monomer has the structure $CH_2=CR-CO_2R'$, in which each of R and R' separately represents hydrogen or a linear, branched, or cyclic $C_1-C_{30}$ alkyl, aryl, aralkyl, or alkoxyalkyl group.

3. The method of claim 1 wherein the acrylate monomer is selected from the group consisting of linear and branched $C_1-C_{10}$ alkyl esters of acrylic and methacrylic acid.

4. The method of claim 1 wherein the acrylate monomer is selected from the group consisting of n-butyl acrylate, n-hexyl acrylate, 2-ethylhexyl methacrylate, 2-ethylhexyl acrylate, and n-butyl methacrylate.

5. The method of claim 1 wherein the styrenic monomer is styrene.

6. The method of claim 1 wherein the acrylate monomer is included at the start of the polymerization.

7. The method of claim 1 wherein addition of the acrylate monomer is delayed until the polymerization is already in progress.

8. A method for improving the expandability of styrenic polymer particles, said method comprising copolymerizing in an aqueous suspension a styrenic monomer and an acrylate monomer in the presence of styrenic polymer seed particles to form coated particles having a styrenic polymer core and a styrenic/acrylate copolymer outer coating, wherein the amount of acrylate monomer used is within the range of about 0.3 to about 5 weight percent based on the amount of styrenic monomer and said amount to improve expandability of the coated particles without adversely affecting their heat sensitivity.

9. The method of claim 8 wherein the acrylate monomer has the structure $CH_2=CR-CO_2R'$, in which each of R and R, separately represents hydrogen or a linear, branched, or cyclic $C_1-C_{30}$ alkyl, aryl, aralkyl, or alkoxyalkyl group.

10. The method of claim 8 wherein the acrylate monomer is selected from the group consisting of linear and branched $C_1-C_{10}$ alkyl esters of acrylic and methacrylic acid.

11. The method of claim 8 wherein the acrylate monomer is selected from the group consisting of n-butyl acrylate, n-hexyl acrylate, 2-ethylhexyl methacrylate, 2-ethylhexyl acrylate, and n-butyl methacrylate.

12. The method of claim 8 wherein the styrenic monomer is styrene.

* * * * *